Jan. 29, 1924.

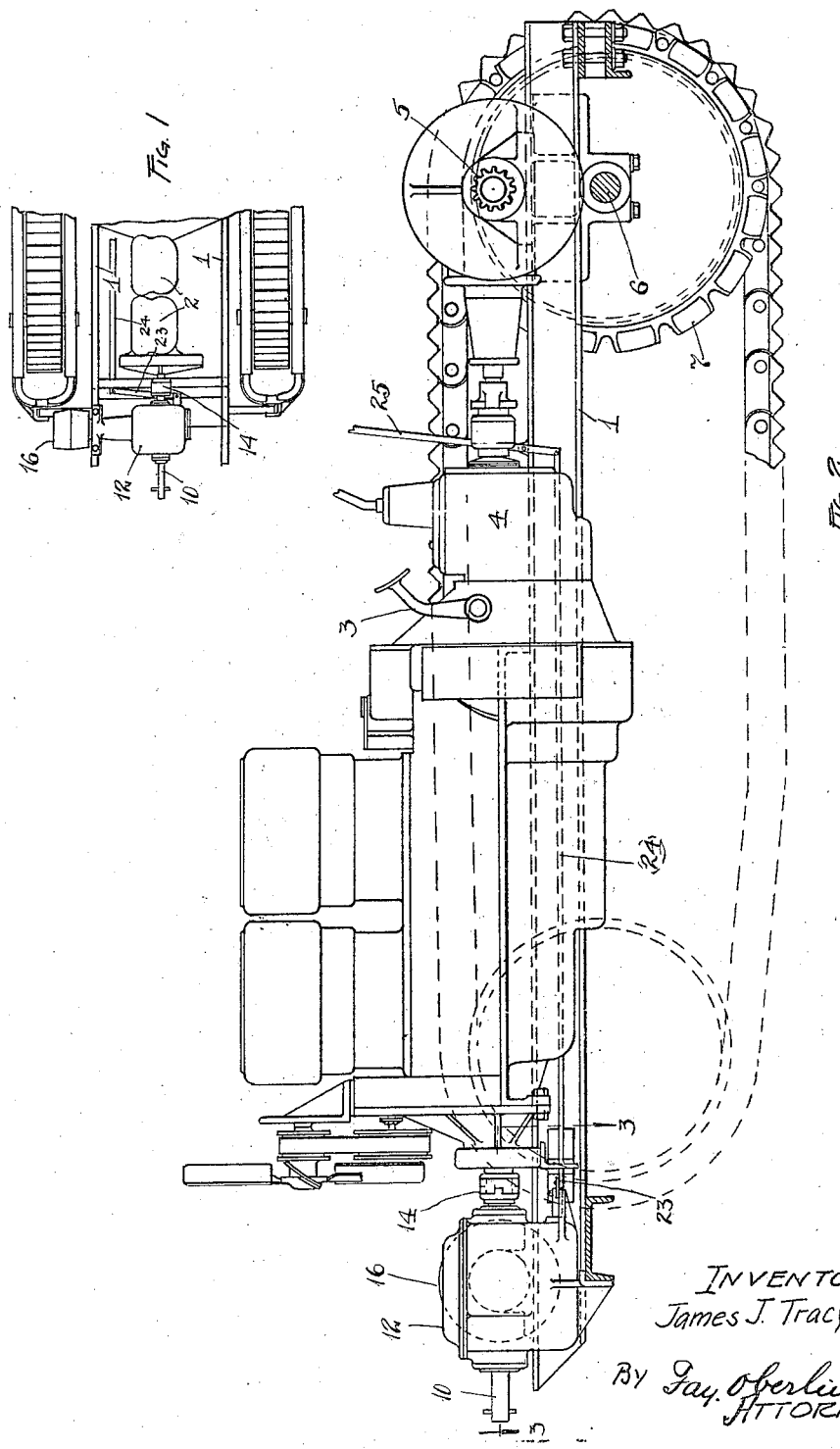

J. J. TRACY 1,481,816

POWER MECHANISM FOR TRACTORS

Filed July 15, 1918    2 Sheets-Sheet 2

INVENTOR
James J. Tracy

BY Fay, Oberlin & Fay
ATTORNEYS.

Patented Jan. 29, 1924.

1,481,816

UNITED STATES PATENT OFFICE.

JAMES J. TRACY, OF CLEVELAND, OHIO.

POWER MECHANISM FOR TRACTORS.

Application filed July 15, 1918. Serial No. 244,872.

*To all whom it may concern:*

Be it known that I, JAMES J. TRACY, a citizen of the United States, and a resident of Cleveland, County of Cuyahoga, and State of Ohio, have invented a new and useful Improvement in Power Mechanism for Tractors, of which the following is a specification, the principle of the invention being herein explained and the best mode in which I have contemplated applying that principle, so as to distinguish it from other inventions.

The present improvements, relating, as indicated, to power mechanism for tractors, have more particular regard to the provision on a tractor of a driving pulley so mounted as to permit of its ready and convenient location accurately in line with the pulley wheel on the machine to be driven. A further object is to so mount such driving pulley as to enable the slack on the belt to be taken up without disconnecting said pulley from the power plant or, in other words, interrupting operation of such machine. Still another object is to provide a simple arrangement for controlling the operation of the pulley without interfering with the mechanism provided for driving the tractor itself.

To the accomplishment of the foregoing and related ends, said invention, then, consists of the means hereinafter fully described and particularly pointed out in the claim, the annexed drawings and the following description setting forth in detail certain mechanism embodying the invention, such disclosed means constituting, however, but one of the various mechanical forms in which the principle of the invention may be used.

In said annexed drawings:—

Figure 3:
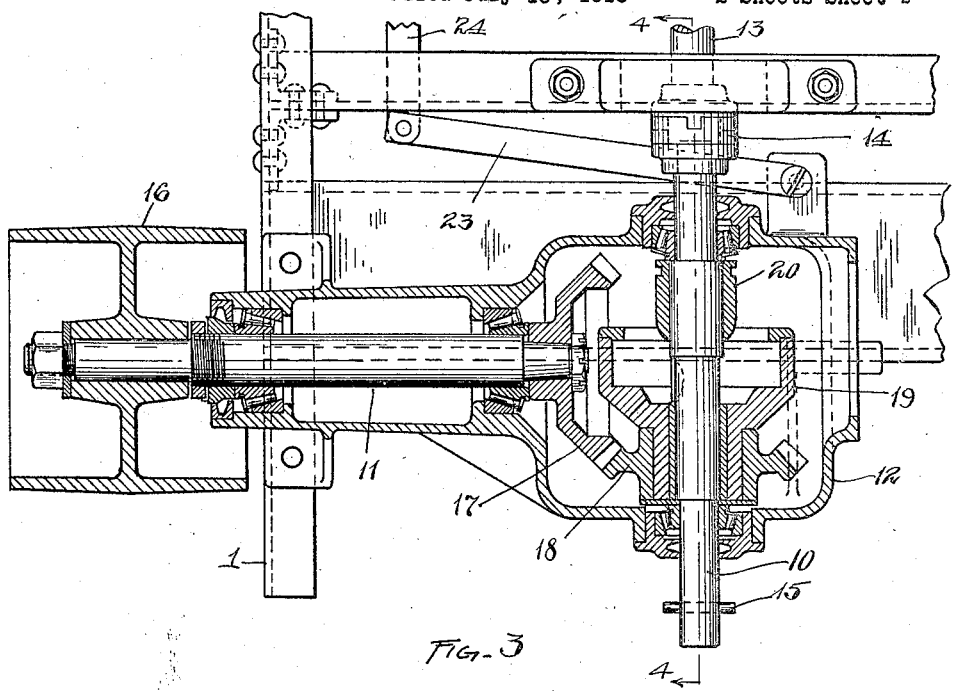
Figure 4:
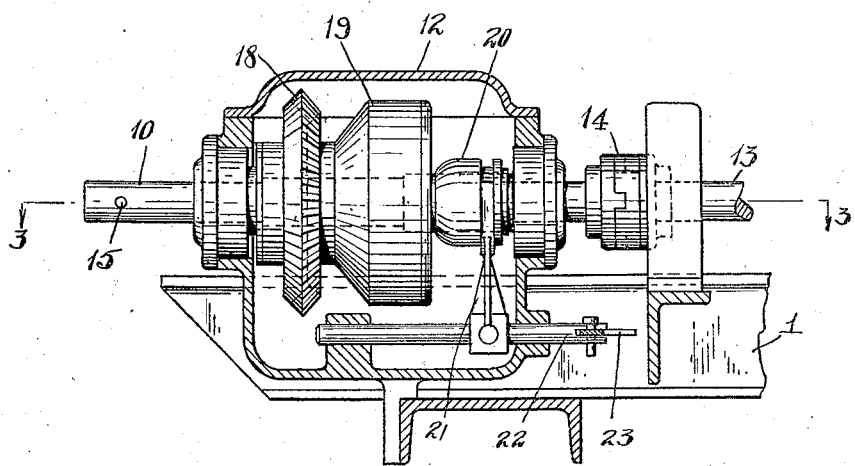

Fig. 1 is a broken plan view of a tractor equipped with our present improved power mechanism; Fig. 2 is a side elevational view, with parts shown in section and other parts (the running gear) in outline; Figure 3 is a horizontal sectional view of the power mechanism proper, the plane of such section being indicated by the line 3—3, Figs. 2 and 4; and Fig. 4 is a vertical section of such mechanism, the plane of such section being indicated by the line 4—4, Fig. 3.

As indicated in connection with the description of the drawings just given, the tractor shown, consists simply of the main frame 1 wherein is mounted a suitable motor 2, specifically an internal combustion engine of familiar type. For the purpose of propelling the tractor, said engine is connected through a suitable clutch 3, and change speed gear 4, with differentially driven shafts 5, through which motion is communicated to the driving wheels 7. These are intended to be mounted upon a stationary shaft 6, one on each side of the frame 1, and may consist of ordinary traction wheels, instead of traction members of the planking-tread type as shown. The manner in which the front end of the frame will be supported will depend upon the form of traction member thus employed, and is not a matter of present interest, since it affects in no way the construction and operation of the power mechanism.

The latter is mounted on the main frame 1 in front of the engine or motor 2 and consists primarily of two rectangularly disposed shafts 10 and 11 (Fig. 3), suitably mounted in a casing 12, that serves to house the intermediate portions of said shafts and the gears and other parts now to be described. The first of these shafts, i. e. shaft 10, is thus supported directly in line with the crank shaft 13 of the engine 2, being connected thereto by a suitable coupling 14 so as to constitute in effect a prolongation of the same. The outer end of this shaft, for example, is provided with a cross pin 15 to enable a crank to be affixed thereto for manually cranking or turning the engine, when necessary. The rectangularly disposed shaft 11, as indicated in Figs. 1 and 3 projects beyond the corresponding side member of the tractor frame and carries a suitable belt pulley 16, for use in driving the machine to be operated from the tractor.

The mechanism for operatively connecting the two shafts comprises a beveled gear 17 fixedly mounted on the pulley shaft 11, so as to rotate therewith, and a second bevel gear 18 normally loosely mounted on the other shaft 10, being carried by one part of a friction clutch 19, shown as of expanding ring type, which is adapted to be non-rotatably secured to said shaft by sliding the cone collar 20 forwardly along the same. Operation of this cone collar is effected through a fork 21 that engages therewith from below, being carried on a rod 22 adapted to be reciprocated through a lever 23 and rod 24 from a second lever 25 mounted at the rear end of the tractor frame convenient to the hand of the operator, for whom a seat (not shown) will be provided. The clutch may of course be of the multiple disk type and produce the same effect. From the foregoing description of the construction of our improved power mechanism, it will be seen that the shaft 11 carrying the driving pulley 16 is normally disconnected from the power plant, but that by simply operating the lever 25 so as to throw in the clutch 19, the beveled gear 18 is non-rotatably fixed to the shaft 10 thereby causing the pulley to be driven. The connecting, or disconnecting, in this fashion, of the pulley shaft with the engine shaft is entirely independent of the clutch 3 and change speed gear 4, through which the driving of the tractor, proper, is accomplished.

It accordingly is possible to shift the position of the tractor, and particularly to advance or retract the same on the ground, to vary the tension on the belt on pulley 16 all without disconnecting the pulley or interrupting operation of the machine driven by such belt. The location of the pulley, furthermore, is such that the driver from his seat can readily line up the same with the pulley on the machine to be driven, and then advance or retract the tractor to suit the length of the belt. When the tractor is properly positioned for the purpose, and the change speed gear thrown into neutral, or the traction members otherwise disconnected from the engine, the latter may be employed wholly as a power plant for operating the pulley, as will be readily understood, the pulley being connected or disconnected, as occasion may require, through the operation of the clutch which controls the same independently of the clutch and transmission mechanism at the other end of the engine.

Other modes of applying the principle of my invention may be employed instead of the one explained, change being made as regards the mechanism herein disclosed, provided the means stated be any of the following claim or the equivalent of such stated means be employed.

I therefore particularly point out and distinctly claim as my invention—

In a tractor, the combination of a frame and traction members therefor; of an engine mounted in said frame with its shaft disposed longitudinally thereof; means including a clutch and change-speed gear for operatively connecting one end of the engine shaft with said traction members; control levers for said means; a casing supported on a cross member of said frame adjacent the other end of said engine shaft; an extension shaft continuously coupled to said engine shaft and supported in alignment therewith in said casing; a lateral extension on said casing supported on a side member of said frame; a power shaft mounted in said lateral extension at right angles to said extension shaft; a beveled gear secured to the inner end of said power shaft and a belt pulley secured to the outer end thereof; a clutch element rotatably mounted on said extension shaft; a beveled gear mounted on said clutch element and in constant engagement with the beveled gear of said power shaft; a companion clutch element splined on said extension shaft for engagement with said first-named clutch element; a clutch shifting mechanism slidably mounted within said casing and a hand lever for controlling said clutch shifting mechanism located adjacent the control levers of said tractor.

Signed by me, this 12th day of July, 1918.

JAMES J. TRACY.